(No Model.)
C. C. PECK.
PROCESS OF PURIFYING BRINE.
No. 423,949. Patented Mar. 25, 1890.
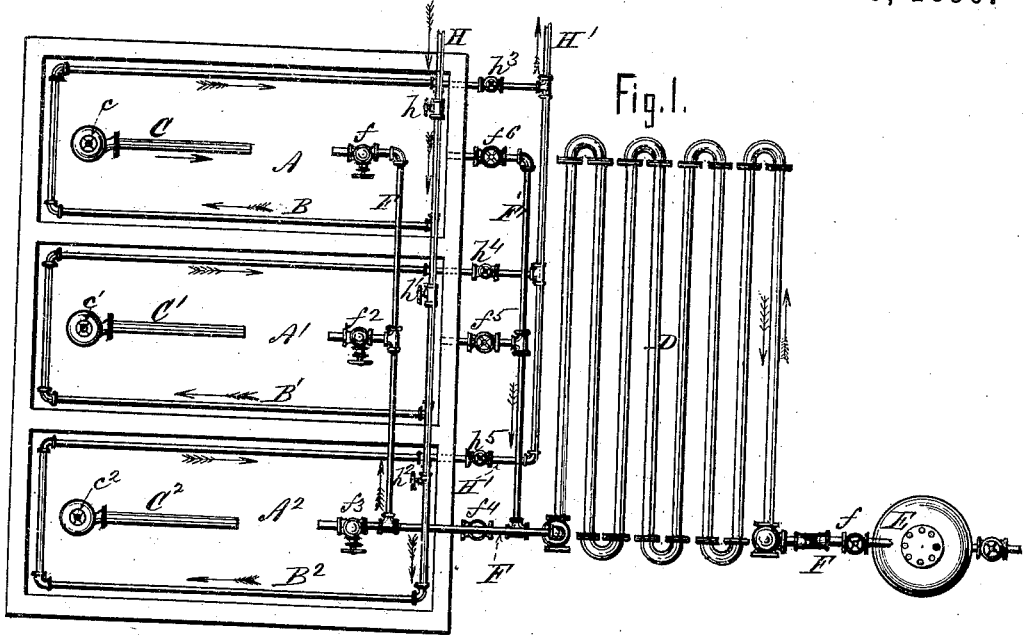
Fig. I.
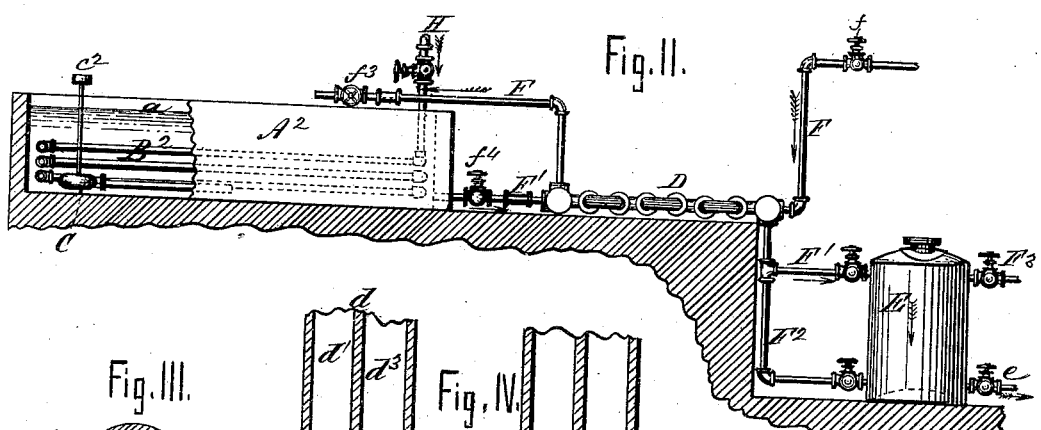
Fig. II.
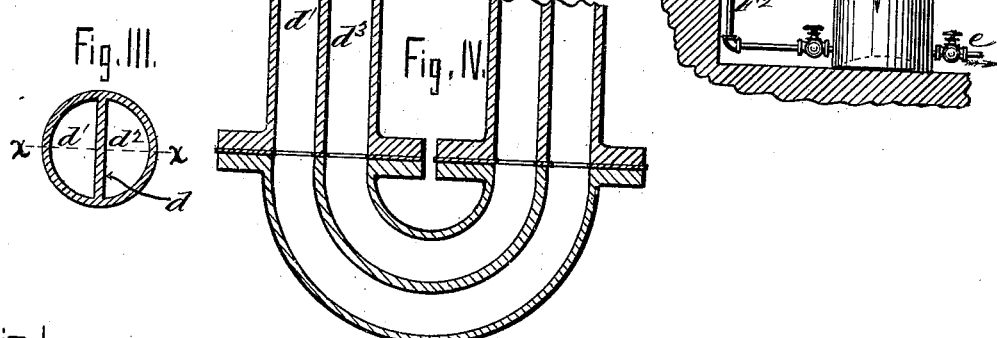
Fig. III. Fig. IV.
WITNESSES:
Geo. H. Miatt
O. W. Gardner
INVENTOR:
Cassius C. Peck

UNITED STATES PATENT OFFICE.

CASSIUS C. PECK, OF NEW YORK, N. Y.

PROCESS OF PURIFYING BRINE.

SPECIFICATION forming part of Letters Patent No. 423,949, dated March 25, 1890.

Application filed April 6, 1889. Serial No. 306,240. (No model.)

*To all whom it may concern:*

Be it known that I, CASSIUS C. PECK, a citizen of the United States, residing in the city, county, and State of New York, have invented a certain new and useful Process of Purifying Brine, of which the following is a specification.

My invention relates to the art of making salt from brine; and it consists in a process of purifying the brine preparatory to evaporating it by means of the combined action of heat and carbonate of soda. Sufficient heat is employed to precipitate the carbonates of lime, magnesium, &c., and cause the aggregation of solid particles held in suspension, and carbonate of soda is used in connection with artificial heat to effect the precipitation of sulphates of lime, magnesium, &c., and chlorides of calcium and magnesium.

I am aware that it is common to heat water to its boiling-point in order to free it from carbonate of lime. I am also aware that caustic soda and carbonate of soda have been used to soften water by causing the precipitation of sulphate of lime; also, that the carbonate of an alkali, in connection with caustic alkali, has been employed at temperatures of 140° to 158° Fahrenheit to purify brine, as also carbonate of soda mixed with brine when cold, in connection with jets of air, for the same purpose; but I am not aware that the method hereinafter described has been applied to nearly saturated solutions of salt and water used in manufacturing salt from brine. The presence of salt (NaCl) in water has the effect of retarding chemical action, and it becomes necessary to provide different conditions in purifying brine from what are needed in purifying ordinary water. In other words, strong solutions of brine constitute an essentially different liquid from ordinary water for purposes of purification. Thus certain temperatures applied to ordinary water will cause the precipitation of nearly all the sulphate of lime which it contains, while the same temperatures will effect the precipitation of very little sulphate of lime from strong brine.

I am enabled by my process to produce new and valuable results, inasmuch as the salt is freed from certain deleterious substances otherwise difficult of removal, and which have not heretofore been effectually removed. Such substances are sulphate of lime and chloride of magnesium and of calcium. The two latter substances give to salt a bitter and nauseating taste, and by their deliquescence cause absorption of moisture from the atmosphere after the salt has been manufactured.

In the accompanying drawings I show apparatus suitable for carrying out my process practically, although I do not wish to confine myself to the use of any special form or construction of apparatus, since it is obvious that various modifications may be made therein without deviating from the essential features of my invention.

In the drawings, Figure I is a plan view of apparatus for carrying out my process. Fig. II is a side elevation with a portion of the tank broken away to show the interior arrangement of heating-pipes and centrifugal pump. Fig. III is a cross-section of one of the cooler-pipes, and Fig. IV is a sectional plan through line $xx$, Fig. III, showing the interior construction of the cooler-pipes.

Feathered arrows indicate the circulation of steam-supply, arrows feathered on but one side show the direction of movement of the feed-brine, and arrows without feathering refer to the circulation of brine which has been treated in the tanks and is flowing toward the filter.

A A' A² are three independent heating-tanks for heating the brine under treatment.

B B' B² are coils of pipes heated by a circulation of steam or hot liquid.

C C' C² are vertically-set centrifugal pumps provided with driving-pulleys $c$ $c'$ $c^2$ for giving a rapid circulation to the brine in the tanks.

D is a combined heater and cooler, which, for the sake of convenience, I shall term a "cooler," each pipe in which is divided centrally by a diaphragm $d$, Figs. III and IV, into two divisions $d'$ and $d^2$, the inflowing current of brine passing through one division, and the outflowing current through the other division in opposite direction.

E is a filter for separating all suspended solid matter from the brine after the latter has been treated by heat and carbonate of soda.

The operation is as follows: Brine is first delivered into one of the tanks, say tank A, through feed-pipe F by a pump or other means of producing a head, the said pipe being supplied with valves $f f' f^2 f^3$ for regulating the discharge of brine into the several tanks. When the level of liquid is as much above the coil B as is desired, as indicated at $a$, Fig. II, a circulation of steam or hot liquid is produced in heating-coil B. The supply of steam to coils B B' B² is conducted through pipe H, and the return of water of condensation is through pipe H', the supply being regulated by valves $h\ h'\ h^2\ h^3\ h^4\ h^5$. The brine in tank A being heated to about its boiling-point, a sufficient amount of carbonate of soda is added to cause the precipitation of all the sulphate of lime and the chlorides of magnesium and lime. The carbonate of soda is introduced, preferably, in the form of a solution, but may be sprinkled into the tank in the form of powder. In either case it is added gradually to the brine in tank A in order that the chemical reactions may not be so violent as to cause excessive foaming. The thorough admixture of the carbonate of soda with the brine, and the rapid and uniform heating of the latter, is facilitated by centrifugal pump C, which is driven by a belt upon pulley $c$, although the use of this pump is not absolutely necessary. The carbonate of soda may be added to the brine before the latter is heated; but the chemical reactions are more complete and rapid when the brine is in a heated state at the time of mixing in the carbonate. I also prefer to first free the brine from bicarbonates of lime and magnesium before introducing the soda. When brine is heated to near its boiling-point, soluble bicarbonates of lime, &c., are rapidly changed into insoluble carbonates by driving off in the form of gas the carbonic acid which held them in solution. Heat also has the effect of aggregating the particles of solid matter held in suspension in the brine and collecting such particles in flakes or light flocculent masses. In this condition the fine suspended matter will gradually settle to the bottom if left undisturbed or will be strained out if passed through a filter. Carbonate of soda reacts with sulphate of lime and the chlorides of lime and magnesium, producing insoluble carbonates and soluble sulphate of soda. The latter is comparatively harmless in connection with making salt, while sulphate of lime causes great loss and trouble by collecting on heating apparatus, and the chlorides of lime and magnesium greatly injure the quality of salt. The combined action of heat and the carbonate of soda, the action of the latter being intensified by the use of the former, serves to precipitate all elements which prove noticeably injurious either to the evaporating apparatus or to the quality of salt, the result being an important advance in the art of making salt. After heating the brine and admixture of carbonate of soda I prefer to stop the centrifugal pump C and allow the liquid to remain in a quiescent condition for a short time, that floating solid matter may settle to the bottom of tank A, although when a filter, as E, is employed to eliminate all solid material this period of rest may be dispensed with. When the brine is heated and the centrifugal pump in operation, the chemical reactions will be completed almost as soon as the soda is added, and the brine may then be drawn off through pipe F' through cooler D to filter E, and thence through pipe $e$ to evaporating apparatus or to a storage-reservoir. The draw-off pipe F' has a branch connecting with each tank, said branches being provided with valves $f^4 f^5 f^6$. Filter E is provided with secondary pipes F² F³ for reversing the current and washing the filter, which is nearly filled with a mixture of coke and sand. Any other form of filter may be used, the essentials being complete removal of solid matter and convenience in cleaning. When valve $f^6$ is opened and the heated brine in tank A allowed to flow out through cooler D, a corresponding amount of fresh or untreated brine is delivered by a suitable head through pipe F and cooler D into either tank A' or tank A². The two different bodies of liquid pass through cooler D in opposite directions in order that temperatures may be exchanged, the outflowing heated liquid giving up its excess of heat to the inflowing brine, so as to avoid loss of heat in case the purified brine is to be conducted to a storage-reservoir. When, however, the purified brine passes directly from the treating-tanks to evaporating apparatus, cooler D may be dispensed with. The operation is the same with tanks A' and A² as with tank A.

The process of refining or purifying can be conducted with two tanks; but in general it is more convenient to employ three, so that one tank may be cleaned while the process proceeds without interruption in the other two tanks.

When time can be allowed for the separation of solid matter from the brine by deposition, filter E may be dispensed with; but in such case cooler D will be needed to prevent the loss of a large amount of heat. When loss of heat is of little account and time can be allowed for settling the brine after treatment, both filter E and cooler D may be dispensed with.

The most important feature of my invention is the heating of brine to near its boiling-point—say to 200° Fahrenheit and upward—previous to mixing in it the carbonate of soda, and of effecting the mixture while the temperature is thus elevated. This preliminary step of heating the brine to near its boiling-point, by precipitating the carbonates, avoids the need of using caustic alkali or lime, and at the same time intensifies the chemical union of the carbonate of soda with the sulphates and chlorides.

What I claim as my invention, and desire to secure by Letters Patent, is—

1. The process of purifying brine herein set forth, consisting in heating the brine to about its boiling-point and treating with carbonate of soda, substantially in the manner and for the purpose described.

2. The process of purifying brine herein set forth, consisting in heating the brine to about its boiling-point, treating it with carbonate of soda in the manner and for the purpose described, and subsequently cooling the brine by causing it to exchange temperature with a supply of fresh brine, substantially in the manner and for the purpose specified.

3. The process of purifying brine herein set forth, consisting in heating the brine to about its boiling-point, treating it with carbonate of soda in the manner described, cooling the brine under treatment by causing it to exchange temperature with a supply of fresh brine, and then filtering the brine, substantially in the manner and for the purpose described.

4. The process of purifying brine herein set forth, consisting in heating the brine to about its boiling-point, treating it with carbonate of soda in the manner described, and then filtering the brine, substantially in the manner and for the purpose described.

CASSIUS C. PECK.

Witnesses:
L. B. PECK,
H. E. WHITEHOUSE.